US012028952B2

(12) United States Patent
De Best et al.

(10) Patent No.: US 12,028,952 B2
(45) Date of Patent: Jul. 2, 2024

(54) SPARKLE SPOT LIGHT

(71) Applicant: SIGNIFY HOLDING B.V., Eindhoven (NL)

(72) Inventors: Anna Wilhelmina Maria De Best, Veldhoven (NL); Michel Cornelis Josephus Marie Vissenberg, Roermond (NL); Joris Jan Vrehen, Waalre (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 458 days.

(21) Appl. No.: 17/604,064

(22) PCT Filed: Apr. 16, 2020

(86) PCT No.: PCT/EP2020/060656
§ 371 (c)(1),
(2) Date: Oct. 15, 2021

(87) PCT Pub. No.: WO2020/212467
PCT Pub. Date: Oct. 22, 2020

(65) Prior Publication Data

US 2022/0225487 A1 Jul. 14, 2022

(30) Foreign Application Priority Data

Apr. 18, 2019 (EP) .................................... 19170049
May 6, 2019 (EP) .................................... 19172690

(51) Int. Cl.
*H05B 47/155* (2020.01)
*F21V 23/04* (2006.01)
(Continued)

(52) U.S. Cl.
CPC ........... *H05B 47/155* (2020.01); *F21V 23/04* (2013.01); *F21Y 2105/10* (2016.08); *F21Y 2113/10* (2016.08)

(58) Field of Classification Search
None
See application file for complete search history.

(56) References Cited

U.S. PATENT DOCUMENTS 6,685,339 B2 2/2004 Daughtry et al.
8,928,023 B1 1/2015 Coleiny et al.
(Continued)

FOREIGN PATENT DOCUMENTS

CN 103597280 A 2/2014
CN 103874878 A 6/2014
(Continued)

*Primary Examiner* — Crystal L Hammond

(57) ABSTRACT

The invention provides a lighting system (1000) comprising (i) a plurality of light sources (10) configured to generate light source light (11), and (ii) optics (20) configured downstream of the light sources (10), wherein the lighting system (1000) further comprises a 2D array (110) of at least part of the total number of light sources (10), wherein nearest neighboring light sources (10) in the 2D array (110) have an average first shortest distance (dd1), wherein the lighting system (1000) is further configured to generate in an operation mode lighting system light (1001) comprising light source light (11) of a subset of the total number of light sources (10) wherein nearest neighboring light sources (10) configured to generate the light source light (11) for the lighting system light (1001) in the operation mode have an average second shortest distance (dd2), wherein the average second shortest distance (dd2) is larger than average first shortest distance (dd1).

14 Claims, 5 Drawing Sheets

(51) Int. Cl.

| | |
|---|---|
| ***F21Y 105/10*** | (2016.01) |
| ***F21Y 113/10*** | (2016.01) |

(56) References Cited

U.S. PATENT DOCUMENTS

| | | | | |
|---|---|---|---|---|
| 9,074,746 | B2 | 7/2015 | Rice et al. | |
| 9,249,952 | B2 | 2/2016 | Markle et al. | |
| 9,326,347 | B2 * | 4/2016 | Vinther .................. | H05B 45/00 |
| 2003/0151917 | A1 | 8/2003 | Daughtry et al. | |
| 2014/0306612 | A1 | 10/2014 | Woodgate et al. | |
| 2016/0341378 | A1 | 11/2016 | Donners | |

FOREIGN PATENT DOCUMENTS

| | | | |
|---|---|---|---|
| CN | 105980769 | A | 9/2016 |
| CN | 107637062 | A | 1/2018 |
| CN | 108779901 | A | 11/2018 |
| DE | 10201131 | A1 | 8/2003 |
| EP | 2233819 | A1 | 9/2010 |
| WO | 2010150149 | A2 | 12/2010 |
| WO | 2011131197 | A1 | 10/2011 |
| WO | 2012148651 | A2 | 11/2012 |
| WO | 2012167799 | A1 | 12/2012 |

* cited by examiner

SPARKLE SPOT LIGHT

CROSS-REFERENCE TO PRIOR APPLICATIONS

This application is the U.S. National Phase application under 35 U.S.C. § 371 of International Application No. PCT/EP2020/060656, filed on Apr. 16, 2020, which claims the benefit of European Patent Application No. 19170049.1, filed on Apr. 18, 2019, and European Patent Application No. 19172690.0, filed on May 6, 2019. These applications are hereby incorporated by reference herein.

FIELD OF THE INVENTION

The invention relates to a lighting system and to its use.

BACKGROUND OF THE INVENTION

Sparkle light bulbs are known in the art. U.S. Pat. No. 6,685,339, for instance, describes a sparkle light bulb comprising a plurality of different colored light-emitting diode (LED) bulbs mounted in a predetermined spaced-apart arrangement on a circuit board; controller circuit means in electrically operative communication with the plurality of different colored LED bulbs for selectively operating the plurality of different colored LED bulbs in one of color wash mode and color dance mode; the controller circuit means further including memory means for further selectively locking the plurality of different colored LED bulbs in a desired color pattern; the controller circuit means, including the memory means, being in electrically operative communication with means for electrically connecting the sparkle light bulb to a 12 VAC power source; and a light bulb housing having an open proximal end from which the plurality of different colored LED bulbs are exposed for emitting generated light and a closed distal end, at which the means for electrically connecting the sparkle light bulb to the 12 VAC power source is located. The plurality of different colored LED bulbs includes a combination of red, green and blue LED bulbs.

SUMMARY OF THE INVENTION

Nowadays (narrow beam) spots often contain a single LED light source, such as a COB, or several individual LED's closely packed, in front of which an optic is placed to collimate the light in a predetermined beam angle. The LED source is generally driven by a single current source. Dimming is achieved by changing the current through the LED source. The luminance of the spot is constant. The appearance can be glary or not glary, but it will not be perceived as sparkly.

However, sparkling effects may be desirable. Especially, a sparkling lighting device may be desirable as such device may provide a pleasant effect per se when viewed (at different positions) or on a (specular reflective) object that is illuminated with the light of the lighting device.

Hence, it is an aspect of the invention to provide an alternative lighting system (or lighting device), which preferably further at least partly obviates one or more of above-described drawbacks. The present invention may have as object to overcome or ameliorate at least one of the disadvantages of the prior art, or to provide a useful alternative.

"Sparkle" (also known as "beautiful glare" or "attractive glare") may especially be based on spatial and/or temporal effects. Amongst others, it is herein proposed to add spatial effects and/or temporal dynamics, such as in embodiments by switching on and off LEDs on specific positions. This may e.g. have little or no effect on the beam angle and/or on the center beam intensity. The appearance of objects in the spot with diffuse reflective surfaces may essentially remain constant, but objects with specular reflective surfaces may especially show sparkle. Also, the spot, or other type of lighting device, itself will may have a sparkling appearance when looking at it from a direction outside of the beam.

Hence, in a first aspect the invention provides a lighting system comprising (i) a plurality of light sources configured to generate light source light. Further, the lighting system may comprise (ii) (imaging) optics configured downstream of the light sources. Especially, the lighting system (further) comprises a 2D array of at least part of the total number of (the plurality of) light sources. In specific embodiments, nearest neighboring light sources in the 2D array have an average first shortest distance (dd1). The lighting system is further in specific embodiments configured to generate in an operation mode lighting system light comprising light source light of a subset of the total number of light sources. In such specific embodiments, nearest neighboring light sources configured to generate the light source light for the lighting system light in the operation mode have an average second shortest distance (dd2), wherein the average second shortest distance (dd2) is larger than average first shortest distance (dd1). Hence, especially the invention provides a lighting system comprising (i) a plurality of light sources configured to generate light source light, and (ii) optics configured downstream of the light sources, wherein the lighting system further comprises a 2D array of at least part of the total number of light sources, wherein nearest neighboring light sources in the 2D array have an average first shortest distance (dd1), wherein the lighting system is further configured to generate in an operation mode lighting system light comprising light source light of a subset of the total number of (the plurality of) light sources, wherein nearest neighboring light sources configured to generate the light source light for the lighting system light in the operation mode have an average second shortest distance (dd2), wherein the average second shortest distance (dd2) is larger than average first shortest distance (dd1), and wherein the lighting system comprises one or more additional light sources configured outside the 2D array at a third shortest distance (dd3) of the additional light sources to the nearest neighbor in the array wherein said third shortest distance (dd3) is at least 20% larger than the average second shortest distance (dd2).

With such lighting system, sparkling effects may be created on specular reflective surfaces that are illuminated by the lighting system light (in the operation mode). Further, when looking to light emitting surface of the lighting system, also a sparkling effect may be perceived. Such lighting system may amongst others be used in a show room, a shop, a museum, or a hospitality area, etc., for illuminating an object. The lighting system may also be used for indoor lighting, such as in domestic applications, e.g. for illuminating an object.

As indicated above, the invention provides a lighting system comprising (i) a plurality of light sources configured to generate light source light. The lighting system thus especially comprises a pixelated lighting device, or a plurality of pixelated lighting devices. The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also refer to a chip scaled package (CSP). A CSP may comprise a single solid state die with provided thereon a luminescent material comprising layer. The term "light source" may also refer to a midpower package. A midpower package may comprise one or more solid state die(s). The die(s) may be covered by a luminescent material comprising layer. The die dimensions may be equal to or smaller than 2 mm, such as in the range of e.g. 0.2-2 mm.

Herein, the term "light source" may also especially refer to a small solid state light source, such as having a mini size or micro size. For instance, the light sources may comprise one or more of mini LEDs and micro LEDs. Especially, in embodiment the light sources comprise micro LEDs or "microLEDs" or "μLEDs". Herein, the term mini size or mini LED especially indicates to solid state light sources having dimensions, such as die dimension, especially length and width, selected from the range of 100 μm-1 mm. Herein, the term μ size or micro LED especially indicates to solid state light sources having dimensions, such as die dimension, especially length and width, selected from the range of 100 μm and smaller.

Hence, in specific embodiments the light sources may comprise solid state light sources. The light sources, such as especially the solid state light sources, may have first dimensions d1 selected from the group of a first length, a first width, a first diagonal length, and a first diameter, wherein the first dimensions d1 are at maximum 2 mm, such as equal to or smaller than 1 mm. In further specific embodiments, the first dimensions d1 are at minimum 100 μm. The term "first dimension" especially refers to the first dimension of a light emitting surface of the light source.

Hence, in embodiments the first dimension may be selected from the range of 100 μm-2 mm. The first dimension especially refers to the dimension(s) of the light emitting area of the light source, such as of a die. In other embodiments, the first dimension may refer to the dimensions of a luminescent layer on a solid state light source. In embodiments, such luminescent layer may essentially have the same dimensions as the die, like in the case of a CSP may be. Such die or such luminescent layer provide a light emitting area from which the light source light escapes from the light source. Those light emitting areas may provide the pixels of the pixelated lighting device or lighting system. Further those light emitting areas may effectively provide the 2D array.

When the light emitting area is essentially square, the first dimension is a first length or a first width, which are essentially identical (i.e. the first width is the first length). When the light emitting area is essentially a rectangle, the first dimension may be a first length, a first width, or a first diagonal length, wherein the first diagonal length is larger than the first length, and the first length is larger than the first width. Especially, the first dimension is the first width, though optionally the first length may be chosen. Hence, in embodiments the first dimension (d1) is selected from a first length and a first width; especially the first dimension may be the first width. When the light emitting area is essentially circular, the first dimension will be a diameter. In such embodiments in fact the first width is the (first) diameter. Further, for other shapes, the circular equivalent circular diameter may be chosen as first dimension. Hence, in embodiments, the width, the diameter, or the circular equivalent diameter, may be chosen as (characteristic) first dimension.

The term "light source" may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin. The phrase "plurality of different light sources" indicates that within the total number of light sources, which is at least two, there are at least two different light sources. Hence, when there is a "plurality of different light sources" and in total there are n light sources, then there are 2-n different light sources.

Especially, when a plurality of light sources are applied, even more a plurality of different light sources, two or more of the light source, especially all may be either individually controlled, or controlled in subsets of the total number of light sources.

For instance, in specific embodiments two or more light sources of the total number of light sources are configured to provide light source light differing in one or more of the color point, color temperature, and color rendering index. In this way, the color point, color temperature, and/or color rendering index of the lighting system light (see also below) can be controlled. Of course, when there are two or more individually controllable light sources, also the intensity (and/or beam shape) of the lighting system light may be controlled. When there are one or more light sources of which the intensity can be controlled, also the intensity of the lighting system light may be controlled.

The term "controlling", and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. . . . Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. . . . . The device is thus not necessarily coupled to the lighting system but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Wi-Fi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

The lighting system may further comprise optics configured downstream of the light sources. The terms "upstream" and "downstream" relate to an arrangement of items or features relative to the propagation of the light from a light generating means (here especially the light source), wherein relative to a first position within a beam of light from the light generating means, a second position in the beam of light closer to the light generating means is "upstream", and a third position within the beam of light further away from the light generating means is "downstream".

The optics are especially configured to shape a beam of the light source light of one or more of the light sources that generate light source light (during the operation mode). In specific embodiments, the optics are light transmissive optics, i.e. comprising light transmissive material, through which the light source light has to propagate to provide downstream thereof the beam shaped lighting system light.

The term "optics" may also refer to a plurality of the same or different optics. When there are more than one optics, the optics may be configured in an array or the optics may be configured in a stack, or the optics may be configured in stacked arrays.

Especially, essentially all light that emanates away from the lighting system passes through the optics.

Hence, in embodiments the optics comprises light transmissive optics. Especially, in embodiments the optics are selected from the group consisting of a lens and a collimator. The collimator may in embodiments be a TIR (total internal refraction) collimator. Especially, in embodiments the optics comprises a Fresnel lens. The Fresnel lens may in embodiments be a TIR Fresnel lens. Hence, in specific embodiment the optics comprise collimating optics.

As indicated above, in embodiments the lighting system may be configured as spot light or may be configured to provide spot light. Hence, in specific embodiments the optics may be configured to generate a beam of lighting system light having an opening angle (θ) of equal to or less than 40°, such as equal to or less than 36°, like equal to or less than 25°. Within such opening angle, especially the intensity (i.e. especially the luminous intensity (in lumen per steradian (lm/sr) or (cd)) within this opening angle is equal to or larger than 50% of the maximum intensity; at angles larger than the opening angle the intensity is smaller than 50% of the maximum intensity. Hence, the beam angle is especially defined by the angles of the full width half maximum (FWHM) intensity of the beam. The FWHM may be arranged symmetrically or non-symmetrically around an optical axis of the lighting system.

At least part of the total number of the light sources of the lighting system may be arranged in a 2D array. This array may be regular or random (such as quasi random). In general, however, the array is configured regular. For instance, in embodiments the light sources may be configured essentially symmetrically about an optical axis of the lighting system. Hence, the light sources in the array may have one or more pitches. The light sources may be configured in a cubic configuration or hexagonal configuration, etc. . . . In addition to these light sources that are configured in the 2D array, there may optionally be further light sources, which may effectively not belong to the array. For instance, they may not have a (heart to heart) distance to any of the other light sources that is essentially identical to the pitch(es); see further also below. Hence, in embodiments the lighting system further comprises a 2D array of at least part of the total number of light sources.

In the array, nearest neighboring light sources in the 2D array may have an average first shortest distance (dd1). In a hexagonal 2D array or a cubic 2D array, the shortest distance between nearest neighbors may be identical for all light sources. In a hexagonal 2D array, each light source (except for those at edges) may have six nearest neighboring light sources; in a cubic 2D array, each light source may have four nearest neighboring light sources. In non-regular arrays, there may be two or more different distances between nearest neighboring light sources. In such embodiments, the (number) average may be taken. For the determination of nearest neighbors, a Voronoi diagram in a Euclidian plane may be used; nearest neighbors are in cells that share edges with the cell with the light source for which the nearest neighbors have to be determined. A Voronoi diagram is a partitioning of a plane into regions based on distance to points in a specific subset of the plane. The points are also called "seeds". Here, the seeds refer to "light sources" (especially their light emitting surfaces). For each seed there is a corresponding region consisting of all points closer to that seed than to any other. These regions are called Voronoi cells.

The lighting system is configured to provide lighting system light (during operation). When all light sources are switched on, there may not be a sparkle effect. Hence, in specific embodiments the lighting system may be configured to generate in an operation mode lighting system light comprising light source light of a subset of the total number of light sources.

Here, the term "subset" especially refers to a number of light sources less than the total number of light sources. Further, in the context of the operation mode, the term "subset of light sources" in general will refer to a number of at least 2 light sources, such as at least 4, though much more light sources in a subset may also be possible. Further, the subset of light sources may especially include one or more light sources of the 2D array.

As indicated above (and also below), the term "operation mode" may also refer to a plurality of different operation modes. Further, the herein described operation mode may not exclude the possibility of one or more other operation modes. In the context of the invention, however, especially operation modes are described that may provide a sparkle effect.

During the operation mode (or operation modes, see also above), especially the nearest neighboring light sources that are configured to generate the light source light for the lighting system light in the operation mode have an average second shortest distance (dd2), wherein the average second shortest distance (dd2) is larger than average first shortest distance (dd1). Hence, the mutual distance between nearest neighbors in the array is smaller than the mutual distance between those (nearest neighbors) light sources that form the subset of lighting system for providing the lighting system light during the operation mode. Hence, the light sources that are especially active during the operation mode, have in average larger mutual distances than all light sources (of the array) (whether or not being active during the operation mode).

Especially, when viewing via the optics into the lighting area that generates the light source light, the individual light sources may essentially not be resolvable, whereas the individual light sources that provide the lighting system light in the operation mode (i.e. the active light sources) may be resolvable. Hence, the resolution when viewing through the optics may be smaller than the dimensions of the individual light sources (such that these individual light sources may not be identified) but may be equal to or higher than of those light sources in the operation mode that may provide the lighting system light. In this way, a diffusively reflective object illuminated with the lighting system light may show a sparkle effect. Further, in this way the lighting area may also provide a sparkle effect. The term "lighting area" refers to the area with the light sources, including the 2D array of light sources (i.e. the light emitting surfaces). The phrase "individual light sources may essentially (not) be resolvable", and similar phrases especially indicate that a human may (not) resolve the individual light emitting surfaces (of the respective light sources). Here, the term "human" may also refer to a panel of humans.

Therefore, in specific embodiments the lighting system is further configured to generate in an operation mode lighting system light comprising light source light of a subset of the total number of light sources, wherein nearest neighboring light sources configured to generate the light source light for the lighting system light in the operation mode (i.e. the active light sources) have an average second shortest distance (dd2), wherein the average second shortest distance (dd2) is larger than average first shortest distance (dd1). Especially, the average second shortest distance is at least twice the average first shortest distance, even more especially the average second shortest distance is at least four times the average first shortest distance, such as the average second shortest distance is at least five times the average first shortest distance. Typically with relatively large third shortest distances, the additional light sources located outside the 2D array are not coupled with the optics, and only the light sources located in the 2D array are optically coupled with the optics. In the context of the invention optically coupled means that light from a light sources, when optically coupled, is issued from the lighting system essentially via the optics. the additional light sources not being optically coupled renders that the visibility of the desired sparkling effect outside the beam will be enhanced.

In further specific embodiments, the lighting system is further configured to generate in an operation mode lighting system light comprising light source light of a subset of the total number of light sources, wherein nearest neighboring light sources configured to generate the light source light for the lighting system light in the operation mode (i.e. the active light sources) have an average second shortest distance (dd2), wherein the average second shortest distance (dd2) is equal to or larger than the first dimension (d1) (see also above), i.e. average second shortest distance dd2≥d1. Especially, in embodiments the average second shortest distance dd2≥1.1*d1, even more especially the average second shortest distance dd2≥1.5*d1. However, in specific embodiments the average second shortest distance dd2≤10*d1, like e.g. the average second shortest distance being equal to or smaller than 5*d1, like especially equal to or smaller than 4*d1. In the latter embodiment, e.g. 4-8% of the LEDs may be on during the operation mode (when e.g. subsets are alternated with time).

The larger the distance between nearest neighboring light sources configured to generate the light source light for the lighting system light in the operation mode (i.e. the active light sources), the larger the optics may be.

The distances between nearest neighboring light sources that provide the lighting system light in the operation mode (i.e. the active light sources) may not all be the same, though in other embodiments these distances may all be the same. Note that the light sources that are chosen to generate the lighting system light (during the operation mode) may be chosen random or may be based on fixed sets. Hence, especially the average second shortest distance is a (number) averaged shortest distance (between nearest neighboring light sources that provide the lighting system light in the operation mode). Likewise, the average first shortest distance is a (number) averaged shortest distance (between nearest neighboring light sources (of the 2D array)).

In embodiments, the total number of light sources in the 2D array is equal to or larger than 24, such as equal to or larger than 36, like equal to or larger than 64. The number of light sources in the array may also be much larger, such as at least 100, like at least 400, such as at least 2,500, etc.

Such (minimum) number of light sources in the 2D array of at least 24, or larger, may allow creating a sparkle effect. With a too low number of light sources, such as less than e.g. 16 independent light emitting areas (such as LED dies) in the lighting area, a sparkle effect may not be created.

Further, in embodiments during the operation mode equal to or less than 50%, such as equal to or less than 35%, like equal to or less than 25%, of the total number of light sources is switched on. Would a percentage lead to a non-natural number, the closest natural number may be chosen (e.g. 32.5 becomes 33 and 32.4 becomes 32). The number of light sources in the subset(s) that are used during the operation mode may be chosen such that the condition of the average second shortest distance (dd2) is larger than average first shortest distance (dd1), especially the average second shortest distance is at least twice the average first shortest distance may (easily) be achieved.

When the light sources are randomly chosen (of the subset(s) for the operation mode), this may be under the condition that (i) the average second shortest distance (dd2) is larger than average first shortest distance (dd1), especially the average second shortest distance is at least twice the average first shortest distance, and/or under the condition that (ii) the average second shortest distance (dd2) is equal to or larger than the first dimension (d1), especially average second shortest distance dd2>d1. Hence, this choice may not be completely random.

In specific embodiments, it may apply that all light sources that are used during the operation mode (i.e. the active light sources) have distances to other neighboring light sources within the subset which are larger than the average first distance (dd1), at least equal to or larger than twice the average first distance (dd1), such as at least equal to or larger than four times the average first distance (dd1), like especially at least equal to or larger than five times average first distance (dd1), such as e.g. equal to or smaller than about 10 times the average first distance (dd1). In specific embodiments, all light sources that are used during the operation mode (i.e. the active light sources) have distances to other neighboring light sources within the subset which are at least equal to or larger than $dd1_a$+d1, such as at least equal to or larger than 2*($dd1_a$+d1), such as e.g. up to about 5*($dd1_a$+d1), like up to about 4*($dd1_a$+d1). Here, $dd1_a$ indicates the average first shortest distance.

In general the first dimension of the light sources is identical for all light sources. Would that not be the case, then also a (number) average first dimension may be selected.

Hence, in other specific embodiments, it may apply that for at least 50% of the total number of light sources, especially in embodiments all light sources that are used during the operation mode (i.e. the active light sources), they have distances to other neighboring light sources within the subset (of active light sources) which are equal to or larger than d1.

A subset of the total number of light sources provides during the operation mode the lighting system light. In embodiments, this especially implies that the other light sources (in the 2D array) are switched off. The light sources that provide the lighting system light may be operated at the respective maximum power (though this is not necessarily the case; in general, however, at least 50% of the respective maximum power). The other light sources may thus be switched off, or may in yet other specific embodiments be dimmed down. Hence, instead of switching on and off, in other embodiments light sources may be dimmed up or dimmed down. Hence, in embodiments a subset of light sources may primarily provide the lighting system light and one or more other light sources of the plurality of light source may also add to the lighting system light, but only with a relatively low power, such as equal to or less than 10% of the total power may be provided by light sources not within the subset that provides the lighting system light. A light source may be considered active when it is not dimmed down below about 10% of its maximum power.

As indicated above, in embodiments there may be only one single operation mode, with a fixed configuration of light sources that provide the lighting system light during that mode. This may still not exclude that there are other operation modes. In such single operation mode with a fixed configuration of light sources, there may not be a change of the light sources that provide the lighting system light during the operation mode in time. However, a change of the light sources that provide the lighting system light in the operation mode may especially provide the sparkle effect (when illuminating a specular reflective object with the lighting system light).

Hence, in specific embodiments the control system may be configured to generate with time different subsets of light sources that provide the lighting system light during the operation mode, wherein the different subsets of course comply with the condition that nearest neighboring light sources configured to generate the light source light for the lighting system light in the operation mode (i.e. the active light sources), have an average second shortest distance dd2, wherein the average second shortest distance (dd2) is larger than average first shortest distance (dd1) (and/or an average second shortest distance dd2≥d1). The light sources that provide the lighting system light in the operation mode of the (two or more) different subsets may be chosen according to a fixed (time) scheme or may (quasi) randomly chosen. Therefore, (two or more) different subsets of the total number of light sources may be configured to generate the lighting system light.

Hence, the light sources of the plurality of light sources (of especially the 2D array) may be each be part of one or more subsets. When there is one operation mode, there may be a single subset. When during the operation mode subsets are changed with time, there are a plurality of subsets. The subsets differ in spatial arrangement of the light sources within the subset (during the operation mode). When there are two or more subsets, different subsets may e.g. have at maximum 50%, such as at maximum 35%, identical light sources (i.e. a light source, at a specific position, this is used in one subset but may also be used in another subset). As indicated above, would a percentage lead to a non-natural number, the closest natural number may be chosen.

Hence, in specific embodiments, wherein (two or more) different subsets of the total number of light sources are configured to generate the lighting system light, especially the lighting system may be configured to generate in the operation mode the lighting system light while alternating over time between two or more of the (two or more) different subsets. When it is alternated over time between two or more different subsets, the (precise) intensity distribution within the beam of lighting system light may vary over time. This may provide a sparkle effect, when viewing the lighting area and/or when viewing an object having specular reflectivity being illuminated with the lighting system light. Herein, the term “alternate” and similar terms especially refer to alternating in time, i.e. one after the other.

The phrase "the lighting system configured to generate in the operation mode the lighting system light", or the phrase "the lighting system configured to generate in the operation mode the lighting system light while alternating over time between two or more of the (two or more) different subsets" and similar phrases, may especially indicate that a control system controls the light sources such that the lighting system light is provided, such as by the (different) light sources of different subsets over time.

As indicated above, there may be a plurality of light sources. In such instances, it may be of interest to control the individual light sources, or individual subsets of light sources. This may allow controlling the intensity of the lighting system light. Further, this may allow selecting a subset or different subsets, respectively, during the operation mode. As indicated above, in embodiments the control system may be configured to (let the lighting system) generate in the operation mode the lighting system light while alternating over time between two or more of the (two or more) different subsets. Hence, the control system may be configured to alternate between subsets of light sources that provide (or do not provide, respectively) the lighting system light. However, in embodiments this may optionally also allow controlling one or more of the color point, color temperature, and rendering index of the lighting system light (during e.g. the operation mode). However, this may also in other operation modes than herein described.

In specific embodiments, wherein is alternated between (two or more) different subsets, it may be desirable that the overall intensity of the lighting system light is essentially constant. Hence, in embodiments the control system may be configured to maintain a constant luminous flux of the lighting system light over time. The phrase "constant luminous flux of the lighting system light over time" may refer to a luminous flux that stays within about +/−10%, such as within +/−5%, from a predetermined value of the luminous flux.

In specific embodiments, the lighting system is configured to alternate between the two or more different subsets with a frequency of equal to or lower than 25 Hz, such as equal to or lower than 10 Hz, like equal to or lower than 5 Hz, like equal to or lower than 1 Hz. Hence, each subset may provide lighting system light during at least 0.04 seconds, such as at least 0.1 second, like at least 0.2 seconds; after such period the system may change to another subset of light sources that provide the lighting system light. In this way, the user may see the sparkling effect over time. In embodiments, an un upper limit of the time a subset may provide the lighting system light before changing to another subset may e.g. be two minutes, such as equal to or less than one minute, such as equal to or less than 30 seconds, like equal to or less than 15 seconds. On the other hand, a too high frequency may not be appreciated by users; therefore, the frequency can be equal to or lower than 5 Hz, like equal to or lower than 1 Hz, like at maximum 0.2 Hz. As can be determined from the above, the phrase "the lighting system is configured to alternate", and similar phrases, may in embodiments indicate that the control system is configured to control the light sources such that the lighting system alternates between the different subsets (and thus between the light sources).

Especially, with larger arrays there may be a relatively large freedom in choosing the subsets, especially when maximum intensity is not necessary. Hence, the subsets can also be chosen such that the spatial intensity distribution within the beam essentially stays the same. In this way, the beam width may essentially stay the same. Hence, in embodiments the lighting system is configured to alternate (in the operation mode) between the two or more different subsets while maintaining a fixed beam width of the lighting system light. Hence, the opening angle of at maximum e.g. about 40° may stay essentially the same, while alternating between the subsets of light sources that provide over time the lighting system light.

Basically, there may be two ways to obtain the sparkle effect. These two options may in embodiments be combined or in other embodiments one of the two options may be chosen. In embodiments, the light sources that comply with the condition that the average distance to the all nearest neighbors of the set that generates the lighting system light is larger than the average first shortest distance (or even equal to or larger than the first dimension) may be selected from the light sources comprised by the 2D array. However, in other embodiments one or more of such light sources may alternatively or additionally be selected from light sources that are configured external from the 2D array. Hence, in embodiments one or more light sources may be configured at a third shortest distance (dd3) to any nearest neighboring light source from the light sources of the 2D array, wherein the third shortest distance (dd3) is at least five times the average first shortest distance (dd1), such as wherein the third shortest distance (dd3) is at least ten times the average first shortest distance (dd1), like the third shortest distance (dd3) is at least 15 times the average first shortest distance (dd1), such as dd3≥20*dd1, such as the third shortest distance dd3 being up to about 1000 times the average first shortest distance (dd1). In specific embodiments, for one or more light sources the shortest distance dd3 to any nearest neighboring light source from the light sources of the 2D array, may be equal to or larger than the first dimension d1, such as third shortest distance dd3 being at least equal to or larger than 1.1*d1, like dd3 being at least equal to or larger than 1.5*d1 (with d1 in embodiments being the length of the characteristic dimension).

In embodiments, the lighting system may comprise one or more lighting devices, which together may provide the plurality of light sources. Hence, none, or one or more of the light devices may comprise light sources that per se do not necessarily comply with the herein described conditions for the lighting system, but together do comply. However, in other embodiments one or more of the lighting devices may comply with the herein described conditions and may thus be as such a lighting system.

In the latter embodiments, the one or more lighting devices may e.g. be controlled by a control system external of the lighting devices, though in other variants one or more of the lighting devices may comprise a control system (for controlling the lighting device light of the lighting device). Further, in such embodiments the one or more lighting devices may especially comprise pixelated lighting devices. The term "pixelated", and similar terms, especially refer to the plurality of light sources, more especially the light emitting areas thereof. The plurality of light sources is at least configured to provide a 2D array of light emitting areas.

Hence, the term "lighting system" may also refer to a plurality of lighting systems, which in embodiments may be functionally coupled (e.g. via the control system).

Further, in specific embodiments the terms "lighting system" or "lighting system light", and similar terms, may thus refer to a lighting device and lighting device light (and similar terms), respectively. Therefore, in embodiments the lighting system may comprise a lighting device, wherein the lighting device comprises the plurality of light sources and the optics. Hence, especially the invention also provides a lighting device comprising (i) a plurality of light sources configured to generate light source light, and (ii) optics configured downstream of the light sources, wherein the lighting device further comprises a 2D array of at least part of the total number of light sources, wherein nearest neighboring light sources in the 2D array have an average first shortest distance (dd1), wherein the lighting device is further configured to generate in an operation mode lighting device light comprising light source light of a subset of the total number of light sources, wherein nearest neighboring light sources configured to generate the light source light for the lighting device light in the operation mode have an average second shortest distance (dd2), wherein the average second shortest distance (dd2) is larger than average first shortest distance (dd1). Such lighting device is thus especially a pixelated lighting device, wherein the pixels are defined by the light emitting areas of the plurality of light sources.

In specific embodiments, such lighting device may be a spot light. For instance, in specific embodiments (the optics of) the lighting device may be configured to generate a beam of lighting device light having an opening angle (θ) of equal to or less than 40°, such as equal to or less than 36°, like equal to or less than 25°.

In embodiments, the lighting system light during the operation mode may be essentially only be visible light, such as at least 80% of the spectral power being in the 380-780 nm range. In embodiments, the lighting system light during the operation mode may be white light.

The term "white light" herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

The terms "visible", "visible light" or "visible emission" and similar terms refer to light having one or more wavelengths in the range of about 380-780 nm.

The lighting system (or device) may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, etc.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

By making different combinations of sources and optics, several beam widths can be created. The housing determines roughly the maximum flux that can be generated. The maximum allowable input power of the LED source(s) may be determined by the amount of heat that can be transferred to the ambient. In general, a small source (COB with a small light emitting area or a closely packed array of Chip Scaled Packages, Mid Power Packages or MicroLEDs) may provide a relatively narrow beam with a high peak intensity, while a larger source (COB with a larger light emitting area or an array of CSPs with larger spacing) may result in a wider beam with lower peak intensity. However, comparable fluxes may be obtained. When the spacing between the CSPs is large, or when the color of the COB source is not uniform, the collimating optical element may provide a certain degree of mixing to make the beam uniform.

Figure 1A:
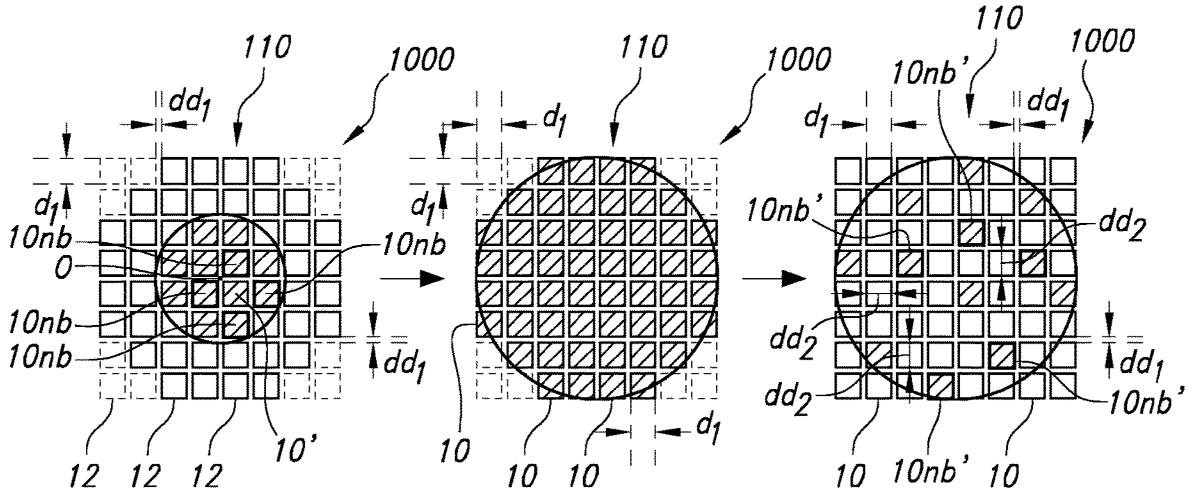
FIGS. 1*a*-1*d* schematically depict some aspects of embodiments of the lighting system (optics not depicted)

FIG. 1*a* schematically depicts on the left a closely packed array of LEDs generating a narrow beam. FIG. 1*a* schematically shows in the middle also a closely packed array of LEDs, but generating a wider beam, dimmed to get the same flux. Further, FIG. 1*a* on the right schematically shows an array of LEDs with larger spacing generating a wider beam with the same flux. Note that when changing the subsets of light sources as indicated in FIG. 1*a*, the concomitant beam shape of the light generated by the light sources may also change.

The hatched square surfaces within the circle on the left and in the circle on the right refer to light sources at e.g. maximum capacity. The hatched square surfaces within the circle in the middle drawing may refer to light sources that that are dimmed, such that the total flux is essentially the same as on the left. The white square areas refer to light sources which are switched off (or in specific embodiments at maximum 10% of its maximum power). Square areas outside the circle on the left or in the middle that are dashed, may be left out as light sources (in principle also applied to drawing on the right).

The small areas (small squares) refer to light sources, indicated with reference 10. The small squares especially represent light emitting surfaces (or surfaces that emit light when the respective light source is switched on). The light sources have a first dimension d1, which is in this case the length or the width (which are equal in this schematically depicted embodiment of essentially square light sources 10/square light emitting areas). The light sources 10 have distances dd1 to neighboring light sources 10. The light sources 10 in this schematically depicted embodiment have a pitch (which is essentially dd1+d1). Further, the light sources 10 are essentially configured symmetrically around an optical axis O. The light sources 10 are configured in an array having cubic symmetry.

The larger area of all small areas, i.e. the larger area of all light emitting surfaces may be indicated as "light emitting area" or "lighting area". Reference 110 indicates an array. The array of light sources 10, or effectively the array of light emitting surfaces of the light sources 10, defines the array 110. There may also be light sources 10 external from the array (see also below). The array 110 essentially defines the lighting area (which comprises the light emitting surfaces or light emitting areas of the individual light sources).

FIG. 1*a* also indicates the nearest neighbors of a randomly chosen light source. The latter light source is indicated with reference 10'. This light source 10' has four nearest neighbors, which are indicated in the drawing with the thicker edge and with references 10*nb*. Would the light emitting surfaces of the light sources be configured in a Voronoi diagram (see also below), the four Voronoi cells would be the only Voronoi cells that share an edge with the Voronoi cell of the light source 10'. Hence, nearest neighboring light sources 10 in the 2D array 110 have an average first shortest distance dd1. More precisely, in this example all light sources 10 have nearest neighboring light sources at distances dd1. Hence, the in the drawing indicated distances dd1 are thus also the average first shortest distance dd1.

On the right of FIG. 1*a*, a subset of light sources of the array 110 are switched on; the remaining light sources are not switched on. The former may be indicated as "active light sources", and similar terms.

Note that instead of switching on and off, in other embodiments light sources may be dimmed up or dimmed down. Hence, a subset of light sources may primarily provide the lighting system light and one or more other light sources of the plurality of light source may also add to the lighting system light, but only with a relatively low power, such as equal to or less than 10% of the total power may be provided by light sources not within the subset that provides the lighting system light. A light source may be considered active when it is not dimmed down below about 10% of its maximum power.

In the subset of light sources on the right of FIG. 1*a*, the distances between nearest neighbors that provide the lighting system light (i.e. the active light sources 10) are larger than between the light sources 10 of the array 110, which distance is dd1. Here, the distances between those light sources 10 that are switched on in the subset are at least the dimensions of the light sources, which is indicated with d1. The distances between these (active) light sources are indicated with dd2. Hence, these light sources 10 of the subset that provide the lighting system light during an operation mode have second shortest distance dd2. Here, these second shortest distance dd2 may differ, see also the drawing wherein the length of dd2 are different between different sets of the light source 10' and its active nearest neighbors. The second shortest distance dd2 for each light source of the light sources 10 of the subset may be averaged, leading to an average second shortest distance dd2.

Hence, on the right in FIG. 1*a* schematically an embodiment of the lighting system 1000 comprising a plurality of light sources 10 configured to generate light source light is provided. The lighting system 1000 comprises a 2D array 110 of at least part of the total number of light sources 10, wherein nearest neighboring light sources 10 in the 2D array 110 have an average first shortest distance dd1. Further, the lighting system 1000 is configured to generate in an operation mode lighting system light 1001 comprising light source light of a subset of the total number of light sources 10 wherein nearest neighboring light sources 10 configured to generate the light source light for the lighting system light 1001 in the operation mode (i.e. the active light sources forming the subset) have an average second shortest distance dd2, wherein the average second shortest distance (dd2) is larger than average first shortest distance (dd1). Here, the average second shortest distance dd2 is at least d1.

The luminance of a prior art spot is constant. The appearance can be glary or not glary, but it will not be perceived as sparkly. "Sparkle" (also known as "beautiful glare" or "attractive glare") is especially based on spatial and/or temporal effects. Amongst others, it is herein proposed to add spatial (see amongst others FIG. 1*a* on the right) and/or temporal dynamics by switching on and off LEDs on specific positions, with little or no effect on the beam angle and the center beam intensity. The appearance of objects in the spot with diffuse reflective surfaces may essentially remain constant, but objects with specular reflective surfaces may show sparkle effects. Also, the spot itself will have a sparkling appearance when looking at it from a direction outside of the beam.

Figure 1B:
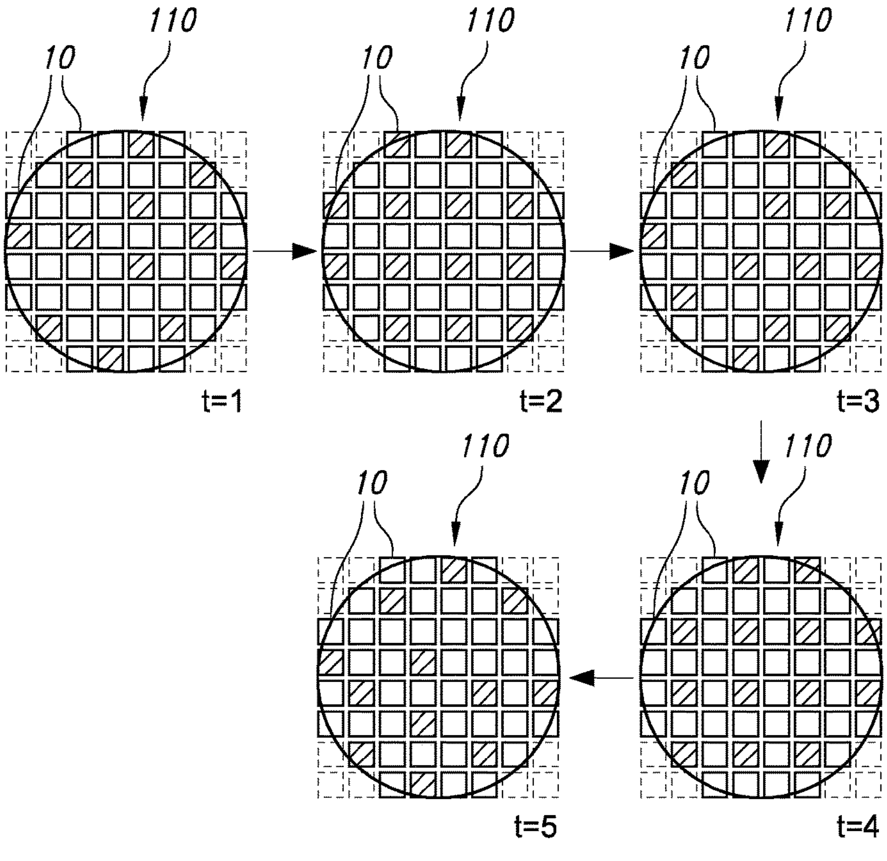

In an embodiment of the invention a matrix array of LEDs (e.g. Chip Scaled Packages, Mid Power Packages or MicroLEDs) may be provided that extends over a specific area. Referring to FIG. 1*b*, at time t1, a fixed number of LEDs is switched on. They form a pattern within the specific area, making sure that the correct beam is produced. At a later point in time t2, another group of LEDs is switched on, with the same number but in a different pattern that still fills the specific area. At time t3, a third pattern with the same number of LEDs is chosen, etc. . . . The switching frequency is chosen to create a sparkle effect when looking at the optics from a fixed direction outside of the beam or at a specular reflecting object in the projected beam. This is schematically depicted in FIG. 1*b*. FIG. 1*b* schematically depicts an embodiment wherein at different moments in time, the same number of LEDs are switched on but in different patterns within the specific area.

At relatively very low frequency the appearance will still be sparkly when the viewing direction changes in time.

As schematically depicted with this 8*8 light sources array, it is possible to create a plurality (here 5 examples) of subsets with the same number of light sources that provide lighting system light. By alternating over time the subsets, a sparkle effect may be created. Hence, for the lighting system 1000 may apply that there may be two or more different subsets of the total number of light sources 10 that can be selected to generate the lighting system light. The lighting system 1000 may thus especially be configured to generate in the operation mode the lighting system light while alternating over time between two or more of the two or more different subsets. In embodiments, the lighting system 1000 may be configured to alternate between the two or more different subsets with a frequency of equal to or lower than 10 Hz. Hence, a control system (see also below), may be configured to have the lighting system generate lighting system light that is provided with (in time) alternating different subset of light sources, with a frequency (of alternation) of equal to or lower than 10 Hz.

As also shown in FIG. 1*b*, there may be a low or essentially no impact on the beam shape of the lighting system light which is based on the light source light of the light sources 10 in the respective subsets (over time). Hence, the lighting system 1000 may be configured to alternate between the two or more different subsets while maintaining an essentially fixed beam width of the lighting system light 1001. Likewise, a constant luminous flux of the lighting system light over time may be maintained (while alternating the subsets during the operation mode).

FIG. 1*b* thus also schematically depicts an embodiment a plurality of different subsets may be used over time to generate the lighting system light during the operation mode. The subsets differ in spatial arrangement of the light sources within the subset (during the operation mode). When there are two or more subsets, different subsets may e.g. have at maximum 50%, such as at maximum 35%, identical light sources.

FIG. 1*b* also schematically depicts 11 an embodiment wherein the total number of light sources 10 in the 2D array 110 is equal to or larger than 36. Further, FIG. 1*b* also schematically depicts an embodiment wherein during the operation mode equal to or less than 35% of the total number of light sources 10 is switched on. Especially, during the operation mode equal to or less than 35% of the total number of light sources 10 may be active.

Figure 1C:
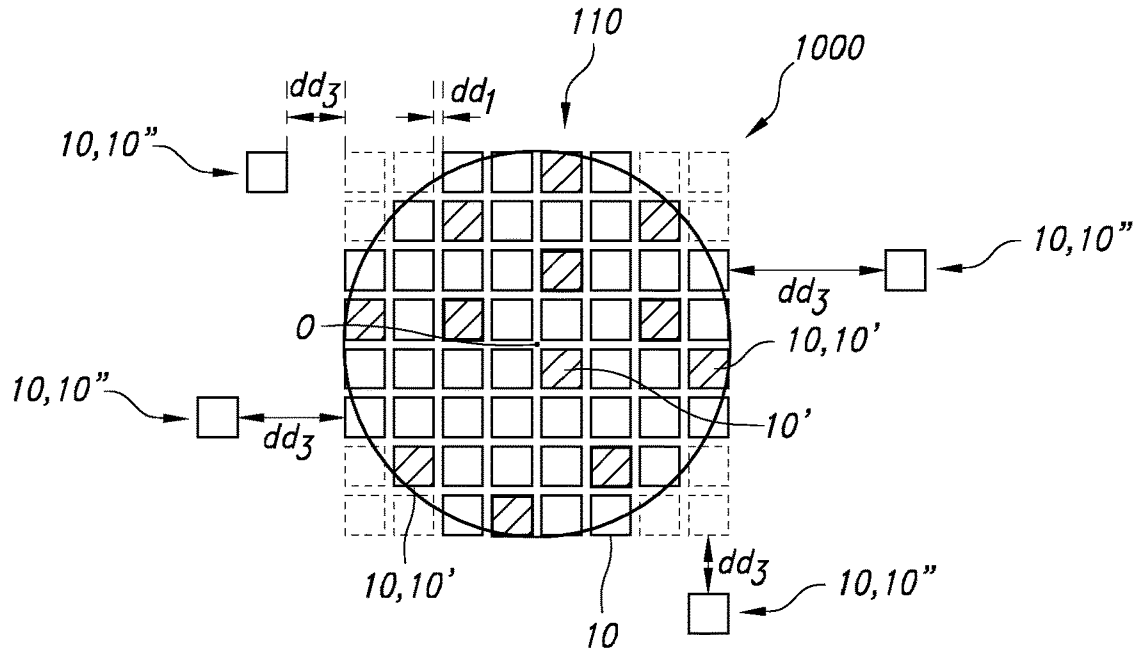

FIG. 1*c* schematically depicts in a bit more detail a possible subset, but now in combination with a specific embodiment, wherein one or more light sources 10 are not configured in the array 110 but are configured external thereof. These light sources are indicated with reference 10". Hence, in embodiments, light sources, such as LEDs, may be configured outside of the specific area. Such light sources can e.g. be switched on and off in a chosen pattern and/or frequency. These light sources may have a very limited effect on the far field intensity distribution but can be used to enhance the sparkle effect when looking at the optics from a direction outside of the beam. The additional light sources may especially be placed sufficiently far away from the main source, such that their peak intensity is outside of the tail of the main beam. Here, the distance of the additional light sources to the nearest neighbor in the array 110 is indicated with dd3. Hence, FIG. 1*c* schematically depicts an embodiment of the lighting system 1000 comprising one or more light sources 10 configured at a third shortest distance dd3 to any nearest neighboring light source 10 from the light sources 10 of the 2D array 110. Especially, the third shortest distance (dd3) is at least five times the average first shortest distance (dd1). In embodiments, dd3≥d1. In average (average over the total number of light sources 10" that are not configured within the array 110), dd3 may be equal to or larger than d1, such as equal to or larger than 1.1*d1.

When in addition to light source 10 in the array 110 there are also light sources 10 outside the array, the average value of dd3 will in general be larger than the average value of dd2, like at least 10% larger, such as at least 20% larger, like at least 50% larger.

Referring to amongst others FIGS. 1*a*, 1*b* and 1*c*, the light sources 10, such as solid state light sources, may have first dimensions d1 selected from the group of a first length, a first width, a first diagonal length, and a first diameter. In embodiments, the first dimension may be selected from the range of 100 μm-2 mm. Further, in embodiments the second average shortest distance dd2 may be equal to or larger than the first dimension d1, wherein the first dimension d1 is selected from a first length and a first width, such as the first width.

Figure 1D:
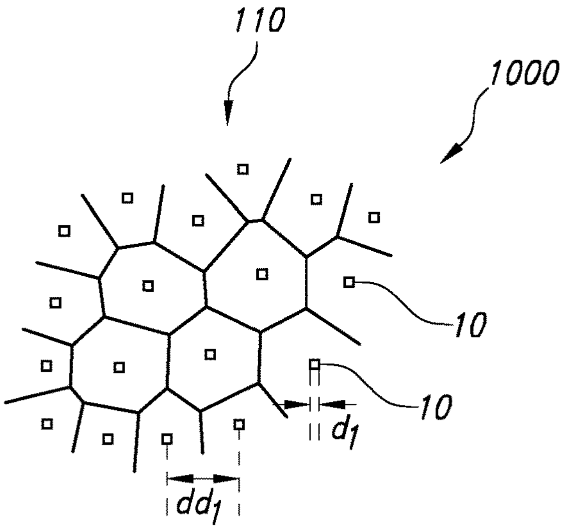

FIG. 1*d* schematically depict a non-regular array 110. Voronoi lines indicating equi-distances between neighboring light source 10 are indicated. Those cells that share an edge include neighboring light sources 10.

Figure 2A:
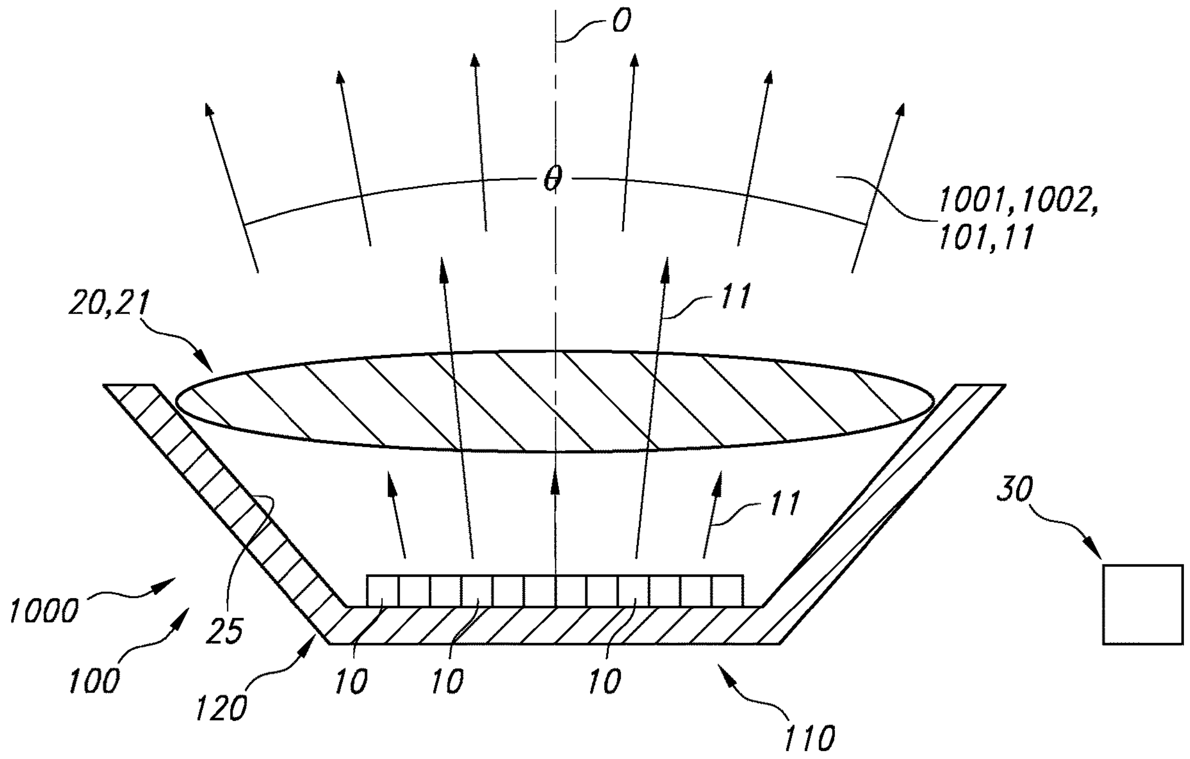
FIGS. 2*a*-2*b* schematically depict some further aspects of embodiments of the lighting system.
Figure 2B:
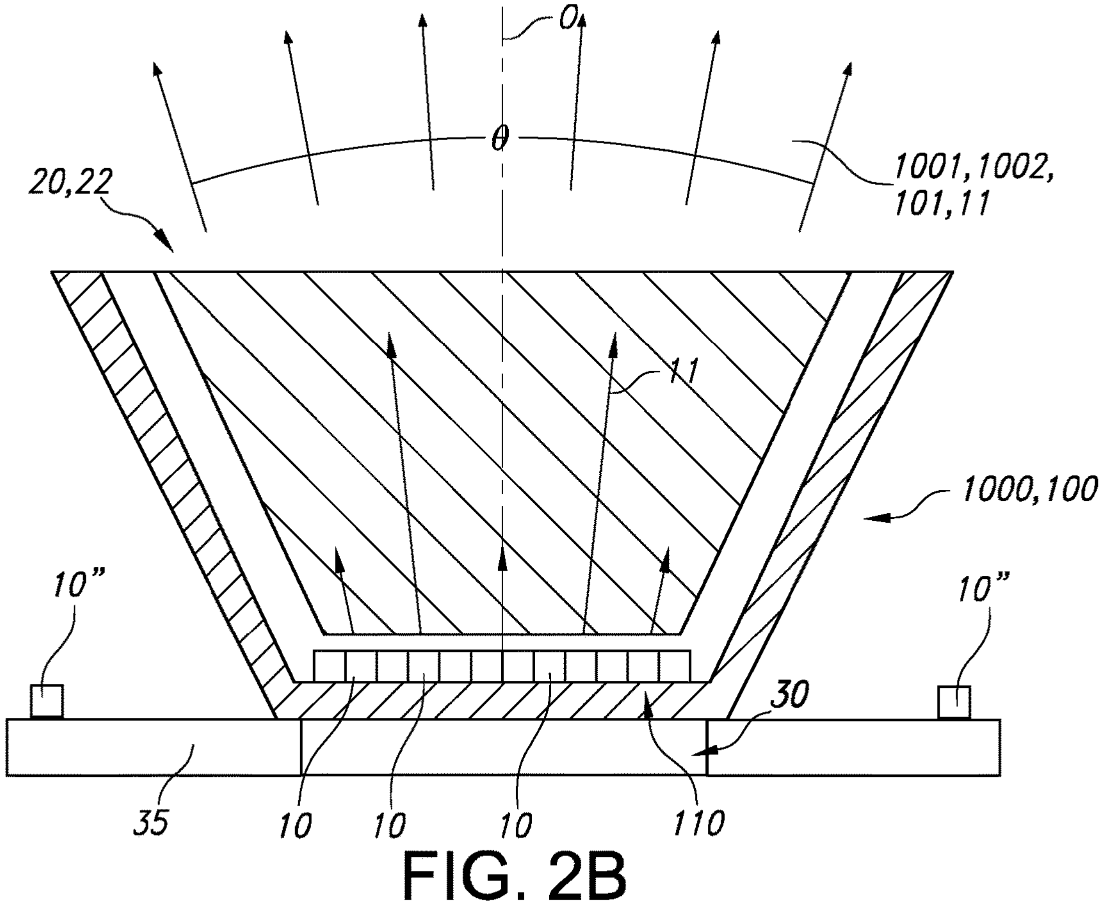

Above embodiments were depicted and described without optical element. FIGS. 2*a* and 2*b* schematically depict some embodiments of the lighting system 1000 including the optical element. Here, embodiments of the lighting system 1000 comprising a plurality of light sources 10 configured to generate light source light 11, and optics 20 configured downstream of the light sources 10, are depicted. As indicated above, the lighting system 1000 comprises a 2D array 110 of at least part of the total number of light sources 10. The lighting system 1000 is further configured to generate lighting system light 1001 comprising light source light 11 of one or more of the light sources 10. In a specific operation mode, the lighting system light 1001 comprises light source light 11 of a subset of the total number of light sources 10. Reference O indicates an optical axis. Reference θ indicates the opening angle of the beam 1002 of lighting system light 1001.

The optics 20 may especially comprise light transmissive optics selected from the group consisting of a lens 21 (see FIG. 2*a*) and a collimator 22 (see FIG. 2*b*). The lens may e.g. be a Fresnel lens. Especially, the optics 20 are configured to generate the beam 1002 of lighting system light 1001. As shown in FIG. 2*b*, the optics is mounted on a carrier 35 the additional light sources 10" mounted on the carrier 35 outside the 2D array 110 are not coupled with the optics 20, but only the light sources 10 located in the 2D array are optically coupled with the optics.

In specific embodiments, wherein the optics 20 may be configured to generate a beam 1002 of lighting system light 1001 having an opening angle θ of equal to or less than 90°. For spot light applications, the opening angle may be smaller. Hence, in specific embodiments the optics 20 may be configured to generate a beam 1002 of lighting system light 1001 having an opening angle θ of equal to or less than 40°, such as equal to or less than 36°, like equal to or less than 25°.

The light transmissive optics especially comprises a light transmissive material, especially a light transparent material. The light transmissive material may be transparent for one or more of UV radiation, visible light, and IR radiation, especially at least visible light. The light transmissive material may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material. However, in another embodiment the light transmissive material may comprise an inorganic material. Especially, the inorganic light transmissive material may be selected from the group consisting of glasses, (fused) quartz, transmissive ceramic materials, and silicones. Also hybrid materials, comprising both inorganic and organic parts may be applied. Especially, the light transmissive material comprises one or more of PMMA, transparent PC, or glass.

FIGS. 2*a*-2*b* also schematically depict an embodiment wherein the lighting system 1000 further comprises a control system 30. The control system 30 may in embodiments be configured to alternate the subset over time in the control mode. The control system 30 may also be configured to maintain a constant luminous flux of the lighting system light 1001 over time. The control system 30 may also be configured to control the lighting system light in other operation modes (or control modes). The control system 30 may be configured to control one or more of color point, color temperature, and color rendering index. The control system may also be configured to select a subset during the operation mode, thereby having the lighting system light being based on the light source light of the subset of light sources. When over time the subset is not changed to another subset, there may still be a sparkle effect (see also above, amongst others at FIG. 1*a*).

FIGS. 2*a*-2*b* schematically also depict embodiments wherein the light sources 10 and optical element 20 are comprised by a single lighting device 100. Hence, these figures also schematically depict embodiments wherein the lighting system 1000 comprises a lighting device 100, wherein the lighting device 100 comprises the plurality of light sources 10 and the optics 20. For instance, in embodiments the lighting device 100 is a spot light. The lighting device is especially configured to generate lighting device light 101. Note that in embodiments the lighting device light 101 may essentially be the lighting system light 1001. Hence, all embodiments described herein in relation to the lighting system light 1001 may also apply to the lighting device light 101.

Reference 25 refers to a reflector, such as with an aluminum layer or other specular reflective material. Reference 120 indicates a housing.

Figure 3A:
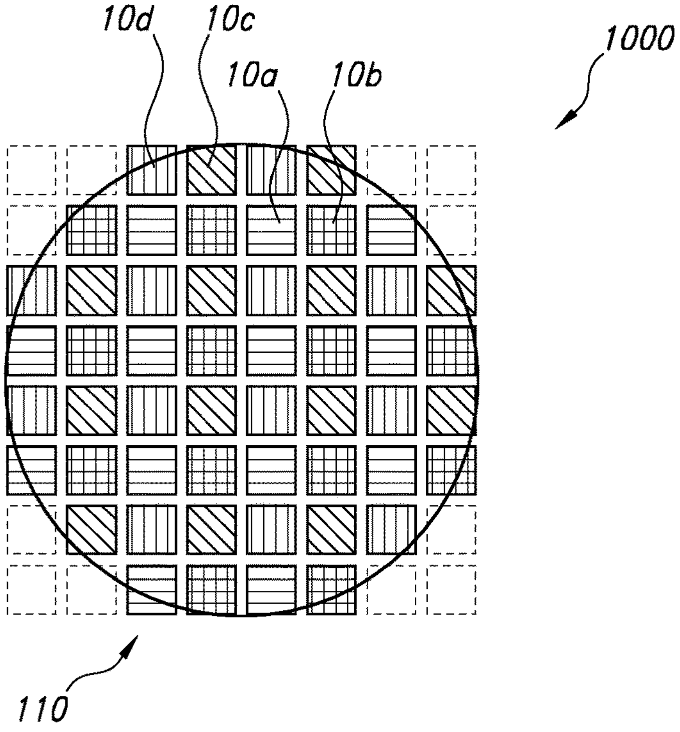
FIGS. 3*a*-3*c* schematically depict yet some further aspects of embodiments of the lighting system.
Figure 3B:
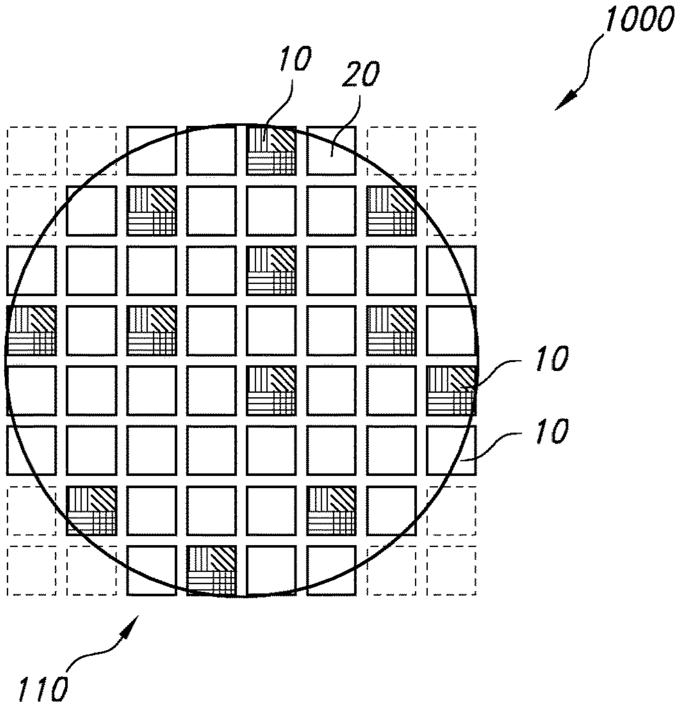

In embodiments, the array 110 may comprise light sources, such as LEDs, configured to emit (mutually) different colors (i.e. different spectral power distributions), as schematically depicted in FIGS. 3*a*-3*b*. The individual hatchings may in embodiments add up to a certain white point at a specific point in time. This may in embodiments lead to colors at the edge of the beam, even if mixing structures are applied. In embodiments, in case clusters of RGB(W) LEDs are used (see FIG. 3*b*), in embodiments each cluster may vary in color over time (with the time-averaged color being a certain white and spatially averaged color being a certain white).

In embodiments, colored light sources, such as LEDs, may be configured (far) outside the specific area, while the light sources, such as LED(s), within the specific area are white. In this way a colored sparkle outside of the beam is created, see e.g. FIG. 3*c*, but especially also FIG. 1*c*.

Figure 3C:
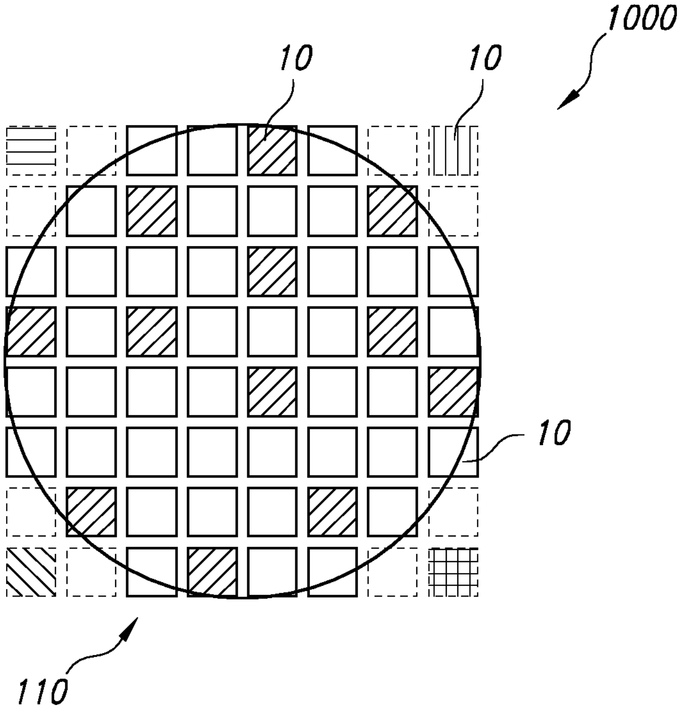

Referring to FIGS. 3*a*-3*c*, in embodiments two or more light sources 10 of the total number of light sources 10 may be configured to provide light source light 11 differing in one or more of the color point, color temperature, and color rendering index.

Figure 4:
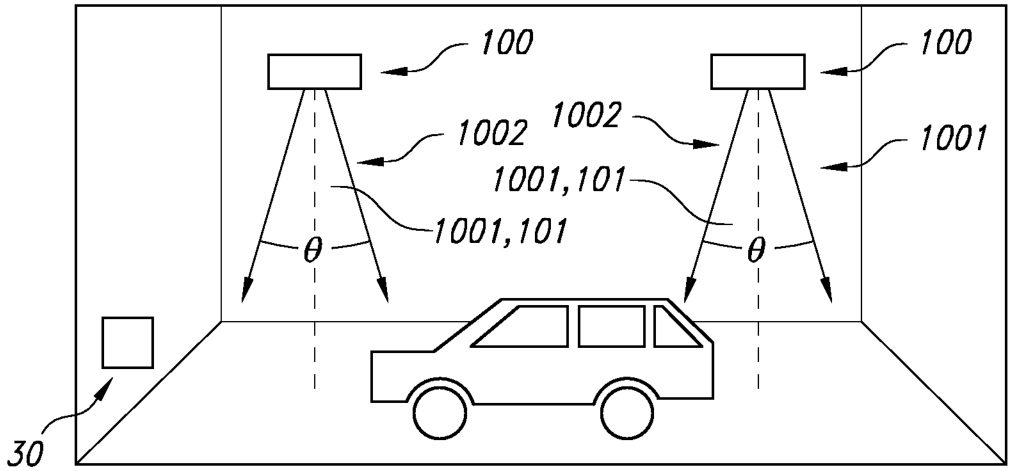
FIG. 4 schematically depict an embodiment of an application of the lighting system.

Very schematically, an application is shown in FIG. 4. Here, the lighting system 1000 comprises two lighting devices (such as luminaire), which each may generate the beam of lighting system light 1001/lighting device light 101, with the sparkle effect as described herein. For instance, the lighting system 1000 may be used in a show room, a shop, a museum, or a hospitality area, for illuminating an object.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system comprising (i) a plurality of light sources configured to generate light source light, and (ii) optics configured downstream of the light sources, wherein the lighting system further comprises a 2D array of at least part of the total number of light sources, wherein nearest neighboring light sources in the 2D array have an average first shortest distance, wherein the lighting system is further configured to generate in an operation mode lighting system light comprising light source light of a subset of the total number of light sources wherein nearest neighboring light sources configured to generate the light source light for the lighting system light in the operation mode have an average second shortest distance, wherein the average second shortest distance is larger than average first shortest distance, and wherein the lighting system comprises one or more additional light sources configured outside the 2D array at a third shortest distance of the additional light sources to the nearest neighbor in the array wherein said third shortest distance is at least 20% larger than the average second shortest distance, wherein two or more different subsets of the total number of light sources are configured to generate the lighting system light, wherein the lighting system is configured to generate in the operation mode the lighting system light while alternating over time between two or more of the two or more different subsets, and different subsets comprise identical light sources up to a maximum of 50% with the number of light sources in each subset being at least four.

2. The lighting system according to claim 1, wherein the optics comprises light transmissive optics selected from the group consisting of a lens and a collimator.

3. The lighting system according to claim 2, wherein the optics are configured to generate a beam of lighting system light having an opening angle (θ) of equal to or less than 40°.

4. The lighting system according to claim 1, wherein the light sources comprise solid state light sources having first dimensions selected from the group of a first length, a first width, a first diagonal length, and a first diameter, and wherein the first dimension is selected from the range of 100 μm-2 mm.

5. The lighting system according to claim 4, wherein the second average shortest distance is equal to or larger than the first dimension, wherein the first dimension is selected from a first length and a first width.

6. The lighting system according to claim 1, wherein the lighting system is configured to alternate between the two or more different subsets with a frequency of equal to or lower than 10 Hz.

7. The lighting system according to claim 6, wherein the lighting system is configured to alternate between the two or more different subsets while maintaining a fixed beam width of the lighting system light.

8. The lighting system according to claim 1, wherein two or more light sources of the total number of light sources are configured to provide light source light differing in one or more of the color point, color temperature, and color rendering index.

9. The lighting system according to claim 1, further comprising a control system, wherein the control system is configured to maintain a constant luminous flux of the lighting system light over time.

10. The lighting system according to claim 1, wherein the total number of light sources in the 2D array is equal to or larger than 36, wherein during the operation mode equal to or less than 35% of the total number of light sources is switched on.

11. The lighting system according to claim 1, wherein only the light sources comprises in the 2D array are optically coupled to the optics.

12. The lighting system according to claim 1, comprising a lighting device, wherein the lighting device comprises the plurality of light sources and the optics.

13. The lighting system according to claim 12, wherein the lighting device is a spot light.

14. Use of the lighting system according to claim 1 in a show room, a shop, a museum, or a hospitality area, for illuminating an object.

* * * * *